US009065533B2

(12) United States Patent
Teyeb et al.

(10) Patent No.: US 9,065,533 B2
(45) Date of Patent: Jun. 23, 2015

(54) OPTIMIZED SIGNALING IN RELAY-ENHANCED ACCESS NETWORKS

(75) Inventors: Oumer Teyeb, Stockholm (SE); Bernhard Raaf, Neuried (DE); Simone Redana, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 157 days.

(21) Appl. No.: 13/583,749

(22) PCT Filed: Mar. 11, 2010

(86) PCT No.: PCT/EP2010/053090
§ 371 (c)(1),
(2), (4) Date: Oct. 10, 2012

(87) PCT Pub. No.: WO2011/110224
PCT Pub. Date: Sep. 15, 2011

(65) Prior Publication Data
US 2013/0039185 A1 Feb. 14, 2013

(51) Int. Cl.
| | |
|---|---|
| H04J 3/24 | (2006.01) |
| H04J 3/18 | (2006.01) |
| H04J 1/00 | (2006.01) |
| H04J 1/14 | (2006.01) |
| H04B 7/26 | (2006.01) |

(Continued)

(52) U.S. Cl.
CPC .............. H04B 7/2606 (2013.01); H04B 7/155 (2013.01); H04W 28/06 (2013.01); H04W 84/047 (2013.01); H04W 92/20 (2013.01)

(58) Field of Classification Search
CPC .................................................. H04W 28/065
USPC ......... 370/315, 434, 442, 444, 473, 477–480, 370/492, 496
See application file for complete search history.

(56) References Cited

U.S. PATENT DOCUMENTS

| | | | |
|---|---|---|---|
| 2008/0070510 A1* | 3/2008 | Doppler et al. | 455/69 |
| 2010/0214972 A1* | 8/2010 | Che et al. | 370/315 |

(Continued)

FOREIGN PATENT DOCUMENTS

| | | |
|---|---|---|
| CN | 101009927 A | 8/2007 |
| EP | 2 026 625 A2 | 2/2009 |

(Continued)

OTHER PUBLICATIONS

Teyeb, Oumer, et al., "Dynamic Relaying in 3GPP LTE-Advanced Networks", Hindawi Publishing Corp., EURASIP Journal on Wireless Communications and Networking, vol. 2009, 11 pgs.

(Continued)

*Primary Examiner* — Redentor Pasia
(74) *Attorney, Agent, or Firm* — Harrington & Smith

(57) ABSTRACT

Measures for optimized signaling in relay-enhanced access networks exemplarily include receipt of at least one signaling message concerning at least one relay node of a relay-enhanced access network over at least one predetermined signaling interface, concentration of signaling concerning a respective relay node in terms of irrelevancy and/or redundancy from the at least one signaling message, and forwarding of the concentrated signaling in a signaling message over the at least one predetermined signaling interface towards the respective relay node. These measures may exemplarily be applied for optimizing X2 messaging in relay-enhanced LTE access networks.

20 Claims, 6 Drawing Sheets

(51) Int. Cl.
*H04B 7/155* (2006.01)
*H04W 28/06* (2009.01)
*H04W 84/04* (2009.01)
*H04W 92/20* (2009.01)

(56) References Cited

U.S. PATENT DOCUMENTS

2011/0103291 A1* 5/2011 Wiberg et al. ............... 370/315
2011/0103292 A1* 5/2011 Pasad et al. .................. 370/315
2011/0103294 A1* 5/2011 Liu et al. ...................... 370/315
2011/0194483 A1* 8/2011 Ji et al. ......................... 370/315

FOREIGN PATENT DOCUMENTS

| | | |
|---|---|---|
| JP | 2004260748 A | 9/2004 |
| JP | 2005303828 A | 10/2005 |
| JP | 200950002 | 6/2013 |
| WO | WO 2009050794 A1 | 4/2009 |
| WO | WO 2009099224 A1 | 8/2009 |
| WO | WO 2010008853 A2 | 1/2010 |
| WO | WO 2010008854 A1 | 1/2010 |

OTHER PUBLICATIONS

Hoymann, Christian, et al., "Multihop Communication in Relay Enhanced IEEE 802.16 Networks", © 2006 IEEE, 4 pgs.

* cited by examiner

OPTIMIZED SIGNALING IN RELAY-ENHANCED ACCESS NETWORKS

FIELD OF THE INVENTION

The present invention relates to optimized signaling in relay-enhanced access networks.

BACKGROUND OF THE INVENTION

In the development of radio communication systems, such as mobile communication systems (like for example GSM (Global System for Mobile Communication), GPRS (General Packet Radio Service), UMTS (Universal Mobile Telecommunication System) or the like), efforts are made for an evolution of the radio access part thereof. In this regard, the evolution of radio access networks (like for example the GSM EDGE radio access network (GERAN) and the Universal Terrestrial Radio Access Network (UTRAN) or the like) is currently addressed. Such improved radio access networks are sometimes denoted as evolved radio access networks (like for example the Evolved Universal Terrestrial Radio Access Network (E-UTRAN)) or as being part of a long-term evolution (LTE) or LTE-Advanced. Although such denominations primarily stem from 3GPP (Third Generation Partnership Project) terminology, the usage thereof hereinafter does not limit the respective description to 3GPP technology, but generally refers to any kind of radio access evolution irrespective of the underlying system architecture. Another example for an applicable broadband access system may for example be IEEE 802.16 also known as WiMAX (Worldwide Interoperability for Microwave Access).

In the following, for the sake of intelligibility, LTE (Long-Term Evolution according to 3GPP terminology) or LTE-Advanced is taken as a non-limiting example for a broadband radio access network being applicable in the context of the present invention and its embodiments.

However, it is to be noted that any kind of radio access network may likewise be applicable, as long as it exhibits comparable features and characteristics as described hereinafter.

In the development of cellular systems in general, and access networks in particular, relaying has been proposed as one concept. In relaying, a user equipment or terminal (UE) is not directly connected with an access node such as a radio base station (e.g. denoted as eNodeB or eNB) of a radio access network (RAN), but via a relay node (RN). Relaying by way of relay nodes RNs has been proposed as a concept for coverage extension in cellular systems. Apart from this main goal of coverage extension, introducing relay concepts can also help in providing high-bit-rate coverage in high shadowing environments, reducing the average radio-transmission power at the a user equipment (thereby leading to long battery life), enhancing cell capacity and effective throughput, (e.g. increasing cell-edge capacity and balancing cell load), and enhancing overall performance and deployment cost of radio access networks.

FIG. 1 shows a schematic diagram of a typical deployment scenario of a relay-enhanced access network, such as e.g. a Long Term Evolution (LTE) RAN with radio-relayed extensions. As shown in FIG. 1, UEs at disadvantages positions such as a cell edge and/or high shadowing areas are connected to a so-called donor base station (DeNB) via a respective RN. The link between DeNB and RN may be referred to as backhaul link, relay link or Un link, and the link between RN and UE may be referred to as access link or Uu link.

A UE Evolved Packet System (EPS) bearer may be considered as a virtual connection between a core network (CN) and the UE, which is characterized by different quality of service (QoS) parameters, and as such the traffic belonging to this bearer will be treated according to these parameters on the different nodes between the gateways and the UE. On the other hand, RN bearers, also referred to as Un bearers, are defined between the RN and DeNB. The mapping of UE EPS bearers and RN bearers can be done either one-to-one (where there is one Un bearer for each UE EPS bearer), or many-to-one (where several UE EPS bearers are mapped into one Un bearer). The many-to-one mapping can be based on mapping criteria such as the QoS requirements or can be done on a per UE basis (i.e. one Un bearer for all bearers of a given UE, regardless of QoS).

In the context of LTE and LTE-Advanced, a Layer 3 (L3) RN, also referred to as Type I RN, is currently taken as a baseline case for the study on relay extensions. Currently, four options for candidate relay architectures are conceivable, the details thereof being out of scope of the present invention. The four candidate relay architectures may be grouped into two categories.

In a relay architecture of a first category, the DeNB is not aware of the individual UE EPS bearers. That is, the relayed UEs are hidden from the DeNB, and the DeNB is aware of only the RNs with which the relayed UEs are connected. Thus, in such a relay architecture only many-to-one mapping is supported, and specifically QoS based mapping (assuming the QoS mapping is done in a node before the DeNB through a marking of the IP headers Type of Service (TOS) field, for example, in accordance with the a QoS parameter such as Quality of Service class identifier (QCI)).

In a relay architecture of a second category, the DeNB is aware of the individual UE EPS bearers of all of the relayed UEs. That is, the DeNB is aware of the relayed UEs as well as of the RNs with which the relayed UEs are connected. Thus, in such relay architecture, it is possible to support both many-to-one (including per UE based mapping) and one-to-one mapping, and the mapping can be done at the DeNB itself, as the UE EPS bearer's information is visible at the DeNB. Even if many-to-one mapping is used, a more appropriate mapping can be employed in the second category architecture as compared with the first category because all the QoS parameters (in addition to the QCI) can be used in the mapping process.

The split of resources between the DeNB-RN link and the RN-UE link may be done dynamically or semi-dynamically depending on the number of UEs connected to the DeNB and to the RNs. In the following, centralized resource partitioning assumed, where the DeNB assigns the resources that each RN connected to it can use to serve its connected UEs. The user scheduling is done at the RNs assuming only the resources assigned by the DeNB are available. Yet, it is noted that distributed resource partitioning may be equally used as well.

In the context of LTE and LTE-Advanced (i.e. in the context of release 8 specifications), a so-called X2 interface is specified as an interface for the interconnection of radio base stations, i.e. two or more eNBs, which may be provided by different vendors, within a radio access network such as an E-UTRAN. The X2 interface is to support an exchange of signaling information as well as user data, and is a point-to-point logical interface being feasible even in the absence of a physical connection between the corresponding eNBs.

The main purposes of information exchanges on the X2 interface relate to UE mobility, load balancing, and inter-cell interference coordination.

Regarding UE mobility, the X2 interface is defined as the default interface for UE mobility. This accelerates the overall handover process by decreasing the time taken during handover preparation as well as the data forwarding time as the source and target eNBs are communicating directly via the X2 interface without involving the core network (CN)

Regarding load balancing (LB), it is noted that there is no centralized radio resource management (RRM) functionality in LTE and LTE-Advanced and the RRM is performed in a decentralized fashion. Hence, there is a need for communicating load information between neighboring eNBs so that a potential imbalance between loads of the eNBs can be counter-balanced. For example, handover threshold parameters may be increased to prevent many UEs from being handed over to an already overloaded eNB. The load balancing information in LTE and LTE-Advanced is sent via the X2 interface.

Regarding inter-cell interference coordination (ICIC), apart from the load information, it is beneficial to eNBs to be aware of the resource utilization in neighboring cells, as LTE and LTE-Advanced uses a reuse factor of 1. For ICIC operation in the downlink, a relative narrowband transmit power (RNTP) bitmap is communicated between the eNBs, telling their neighbors the relative power they are planning to transmit for each resource block (RB). From the RNTP bitmap from all neighboring eNBs, an eNB for example can decide not to schedule cell edge users on specific RBs that most of the neighbors are planning to transmit on. In the uplink, an overload indicator (OI) and high interference indicator (HII) messages are used to facilitate ICIC. The OI summarizes the average uplink interference and noise for each RB, and neighboring eNBs can communicate the OI between themselves via the X2 interface and use it for optimal uplink scheduling. As compared with OI, which is a reactive measure based on information on past transmissions, the HII is a pro-active measure that indicates that the eNB is planning to use certain RBs for cell-edge UEs in the near future. The HII is communicated between neighboring eNBs via the X2 interface and it can be used to prevent a situation where cell-edge UEs belonging to neighboring eNBs being scheduled to use the same RBs at the same time, leading to low uplink signal-to-interference-plus-noise ratio, and hence low uplink throughput.

In addition to the above-outlined usage of the X2 interface in the context of LTE and LTE-Advanced (without relay extensions), the X2 interface is currently also proposed to be used in the context of relaying and relay-enhanced LTE and LTE-Advanced environments. In this context, the X2 interface is specified between a relay node (RN) and its associated donor base station (DeNB), its neighboring relay nodes (RNs), and non-donor base stations (eNBs) (herein, non-donor eNBs refer to eNBs that are not the controlling or donor eNB for the concerned RN, while these eNBs can be DeNBs for other RNs) within a radio access network such as an E-UTRAN.

The X2 interface in relaying contexts may be specifically beneficial for handover scenarios. Namely, the frequency of handovers may be increased with the introduction of relay nodesRNs, in particular when being implemented with X2 interface functionality. Further, the multi-hop nature of the connection between DeNB and UE (via RN) already makes the handover delay larger than in non-relay based systems and, if X2 handover is not supported (i.e. only S1 handover), then the handover requirements of LTE-Advanced might not be met.

Apart from facilitating handovers, the X2 interface could also be used for other purposes such as LB and ICIC in relaying contexts as outlined above. Similar to the case of UE EPS bearers described above, for a relay architecture of the first category, the X2 interface between the RN and its peer nodes is transparent for the DeNB (unless the peer entity is the DeNB itself). For a relay architecture of the second category, the DeNB is aware of the X2 connection between the RN and its peers.

In view of the above, the applicability of X2 interfaces encompassed those between eNBs in LTE/LTE-Advanced contexts and those between RN and DeNB, eNB and/or other RNs in relaying contexts. Accordingly, a "X2 peer" may be any node having a X2 interface/connection, whether this node is an eNB or an RN.

FIG. 2 shows a schematic diagram of a deployment scenario of a relay-enhanced access network, such as e.g. a Long Term Evolution (LTE) RAN with radio-relayed extensions, supporting X2 interfaces. For the sake of clarity, only the X2 connections of RNa are shown. As shown in FIG. 2, a relay node RN has two types of X2 interfaces or connections, one towards its DeNB and another one to its neighbors via its DeNB. For example the relay node RNa in a first cell has X2 interfaces or connections to its associated DeNB1 in the same cell, as well as to the two relay nodes RNb and RNc in another cell (via their associated DeNB2) and to DeNB2 (via DeNB1). Further, there may also exist one or more other base stations not acting as donor base stations for any one of the relay nodes. As shown in FIG. 2, such other base station may be eNB3 having an X2 interface or connection to DeNB1.

Using the X2 interface in relaying contexts, where there are direct X2 connections between a RN and the DeNB, all its neighboring RNs and non-donor eNBs, in the same manner as in LTE/LTE-Advanced contexts (e.g. of release 8) can have the following negative impacts in terms of resource utilization, signaling load, or the like.

Basically, the X2 information exchanged between the RN and its X2 peers (e.g. DeNB, eNB and other RNs) will be transmitted over the Un interface between the RN and its DeNB, thus consuming expensive radio resources (unlike the X2 interface in LTE release 8, which is operating mostly over wired interfaces between the eNBs).

Since X2 connections between peer entities are independent from each other, the same information have to be sent over the Un interface unnecessarily, i.e. multiple times, when the RN is sending X2 information, such as ICIC messages, towards its peers.

FIG. 3 shows a schematic diagram of a deployment scenario of a relay-enhanced access network, such as e.g. a Long Term Evolution (LTE) RAN with radio-relayed extensions, illustrating X2 signaling messaging, such as e.g. for load balancing purposes. As shown in FIG. 3, RNa is sending the same signaling information towards DeNB1, RNb and RNc, which is indicated by solid, dashed and dotted arrows. After receipt at DeNB1, those X2 messages being dedicated to RNb and RNc are forwarded to DeNB2, and then to the respective RNs. Thus, two of the X2 messages sent over the Un interface (i.e. the X2 interface between RNa and DeNB1) are redundant, as well as one of the X2 messages on the X2 interface between the two DeNBs. The non-donor eNB3 is not involved in such signaling for load balancing purposes according to the present example scenario, but may evidently be involved in a different scenario.

For example, if load balancing is performed between two X2-peer relay nodes in different cells, without involving their donor base stations DeNBs (from a logical point of view), a situation might arise where an already loaded DeNB will become overloaded. This is because a first relay node might be lightly loaded while its donor base station DeNB is overloaded, and the X2 peer of a second relay node might try to transfer the load to the first relay node, which can exacerbate the overload situation of the DeNB as the load of a relay node is indirectly shared by its DeNB through the allocation of resources over the Un interface. While this issue may be addressed by setting handover thresholds also taking into account the load experienced by the backhaul link in the donor cell, such approach may not properly address the issue that the same information is unnecessarily sent many times over the X2 interface.

For example, if interference coordination is performed between two X2-peer relay nodes in different cells, without involving their donor base stations DeNBs (from a logical point of view), a situation might arise where irrelevant information is signaled. This is because a first relay node might transmit interference information relating to its resources towards a second relay node, although the second relay node is assigned such resources which may not even interfere with those of the first relay node e.g. because of being orthogonal to each other. Stated in other terms, a particular relay node may receive X2 messages from each of its neighbors, whether or not these messages are relevant to it. This leads to the issue that the irrelevant information is unnecessarily sent, potentially even many times, over the X2 interface.

For example, if a relay node deployment of (very) high density is assumed, needed SCTP (Stream Control Transmission protocol) associations can be quite high, and as such there can be a significant overhead in maintaining these SCTP associations.

For example, if a relay node is mobile, then whenever it changes its donor base station, it might have to establish X2 connections not only with the new donor base station, but also with all the neighboring non-donor base stations of neighboring cells as well as the new relay node neighbors it discovers, and this might lead to considerable delay and overhead on the Un interface.

In summary, an adoption of X2 signaling communication according to current specifications in a relay-enhanced access network is inefficient in terms of resource utilization because it leads to the transmission of redundant as well as irrelevant messages between neighboring nodes.

In view thereof, there has been proposed that a donor base station in LTE shall support proxy functionality and act as a caching point for X2 messages of its subordinate relay nodes. Namely, when the DeNB receives a X2 message request for the information of its relay node (e.g. resource status information or interference information) by a neighboring non-donor base station eNB, the DeNB could be responsible for answering the request (instead of its relay node). Only when the DeNB does not have the information about its RN which is requested, it will send a new request to the RN. Correspondingly, if a RN requests for information of its neighboring eNB or neighboring RN, it could send a request to its DeNB and then the DeNB will be responsible for acknowledging the RN with corresponding information, either by forwarding the request or by answering the request directly from its cache (thus saving resources).

Yet, this approach addresses the redundancy issues only partially, and it does not at all address the relevancy issues of the X2 messages. That is, all neighbors of the RN still receive the same information, which is a waste of resources over the Un link, because at least part of the information might not be relevant for some of the neighbors. For example, in case of a resources partitioning pattern where the RN is using one third of the total resource blocks in its own cell, then it would make no sense to forward information towards it about the other two thirds of the total resource blocks. The present approach may, however, not prevent such waste of resources due to irrelevancy.

It is to be noted that, while the above uses the X2 interface as a non-limiting example for a (logical) signaling interface, any kind of signaling interface may likewise be applicable, as long as it exhibits comparable features and characteristics as the X2 interface.

Accordingly, there does not exist any feasible solution for facilitating efficient optimization of signaling in relay-enhanced access networks.

SUMMARY OF EMBODIMENTS OF THE INVENTION

The present invention and its embodiments aim at solving the above problems.

The present invention and its embodiments are made to provide for a feasible solution for facilitating efficient optimization of signaling in relay-enhanced access networks.

According to an exemplary first aspect of the present invention, there is provided a method comprising receiving at least one signaling message concerning at least one relay node of a relay-enhanced access network over at least one predetermined signaling interface, concentrating signaling concerning a respective relay node in terms of irrelevancy and/or redundancy from the at least one signaling message, and forwarding the concentrated signaling in a signaling message over the at least one predetermined signaling interface towards the respective relay node.

According to further developments or modifications thereof, one or more of the following applies:

said concentrating comprises determining a type of signaling of the at least one received signaling message, gathering relevant and/or non-redundant signaling information for the determined type of signaling from relay nodes of the relay-enhanced access network, and aggregating the gathered signaling information into the signaling message to be forwarded;

the method further comprises synchronizing receiving signaling messages from and/or forwarding signaling messages to relay nodes being controlled by a common donor base station;

if the type of signaling is determined to relate to mobility of a user equipment in the relay-enhanced access network, the signaling information to be gathered and aggregated may include relevant and/or non-redundant address information of a relay node towards which the mobility of the user equipment is directed;

if the type of signaling is determined to relate to load balancing and/or interference coordination, the signaling information to be gathered and aggregated may include relevant and/or non-redundant load information and/or relevant and/or non-redundant information on resource partitioning between relay nodes of the relay-enhanced access network and/or relevant and/or non-redundant information on interference levels at relay nodes of the relay-enhanced access network;

said aggregating comprises weighting of gathered relevant and/or non-redundant signaling information from different relay nodes by weighting factors in accordance with the effect of the signaling information from respective relay nodes on the load balancing and/or interference coordination;

the method further comprises exchanging weighting factors between base stations of the relay-enhanced access network, and/or assigning appropriate weighting factors on the basis of load information and/or resource partitioning and/or interference levels in accordance with an automated neighbor relation;

the method is operable at or by a donor base station controlling said at least one relay node, a non-donor base station not controlling said at least one relay node, and/or a relay node gateway of said at least one relay node, and said donor base station, non-donor base station and/or relay node gateway may be part of an evolved radio access network in accordance with LTE and/or LTE-Advanced specifications; and/or the at least one predetermined signaling interface is a X2 interface in accordance with LTE and/or LTE-Advanced specifications, and peers of the X2 interface may include said donor base station, non-donor base station and/or relay node gateway, said at least one relay node, and/or one or more neighboring relay nodes of said at least one relay node.

According to an exemplary second aspect of the present invention, there is provided an apparatus comprising a receiver configured to receive at least one signaling message concerning at least one relay node of a relay-enhanced access network over at least one predetermined signaling interface, a concentrator processor configured to concentrate signaling concerning a respective relay node in terms of irrelevancy and/or redundancy from the at least one signaling message, and a transmitter configured to forward the concentrated signaling in a signaling message over the at least one predetermined signaling interface towards the respective relay node.

According to further developments or modifications thereof, one or more of the following applies:

said concentrator processor is configured to determine a type of signaling of the at least one received signaling message, gather relevant and/or non-redundant signaling information for the determined type of signaling from relay nodes of the relay-enhanced access network, and aggregate the gathered signaling information into the signaling message to be forwarded;

the apparatus further comprises a synchronizer processor configured to synchronize receiving signaling messages from and/or forwarding signaling messages to relay nodes being controlled by a common donor base station;

if the type of signaling is determined to relate to mobility of a user equipment in the relay-enhanced access network, the signaling information to be gathered and aggregated may include relevant and/or non-redundant address information of a relay node towards which the mobility of the user equipment is directed;

if the type of signaling is determined to relate to load balancing and/or interference coordination, the signaling information to be gathered and aggregated may include relevant and/or non-redundant load information and/or relevant and/or non-redundant information on resource partitioning between relay nodes of the relay-enhanced access network and/or relevant and/or non-redundant information on interference levels at relay nodes of the relay-enhanced access network;

said aggregating comprises weighting of gathered relevant and/or non-redundant signaling information from different relay nodes by weighting factors in accordance with the effect of the signaling information from respective relay nodes on the load balancing and/or interference coordination;

said concentrator processor is further configured to control exchanging weighting factors between base stations of the relay-enhanced access network, and/or to assign appropriate weighting factors on the basis of load information and/or resource partitioning and/or interference levels in accordance with an automated neighbor relation.

the apparatus is operable as or at a donor base station controlling said at least one relay node, a non-donor base station not controlling said at least one relay node, and/or a relay node gateway of said at least one relay node, and said donor base station, non-donor base station and/or relay node gateway may be part of an evolved radio access network in accordance with LTE and/or LTE-Advanced specifications; and/or the at least one predetermined signaling interface is a X2 interface in accordance with LTE and/or LTE-Advanced specifications, and peers of the X2 interface may include said donor base station, non-donor base station and/or relay node gateway, said at least one relay node, and/or one or more neighboring relay nodes of said at least one relay node.

According to an exemplary third aspect of the present invention, there is provided a computer program product including a program comprising software code portions being arranged, when run on a processor of an apparatus, to perform the method according to the first aspect and/or any one of the further developments or modifications thereof.

According to a further development or modification thereof, the computer program product may comprise a computer-readable medium on which the software code portions are stored, and/or the program may be directly loadable into an internal memory of the processor.

By way of exemplary embodiments of the present invention, there are provided mechanisms and measures for improving a signaling interface in relay-enhanced access networks, which may ensure that radio resources as well as backhaul resources are used in an optimized fashion. This may be achieved by a concentration of signaling on the signaling interface so that only non-redundant and/or relevant information is exchanged over the signaling interface.

By way of exemplary embodiments of the present invention, the signaling interface may be an X2 interface and/or the relay-enhanced access network may be based on LTE/LTE-Advanced specifications, such as e.g. an E-UTRAN.

By way of exemplary embodiments of the present invention, the total X2 traffic within a wireless relay-enhanced system may be reduced by decreasing the amount of redundant and/or irrelevant X2 messages, thereby saving precious radio as well as backhaul resources.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

Figure 1:
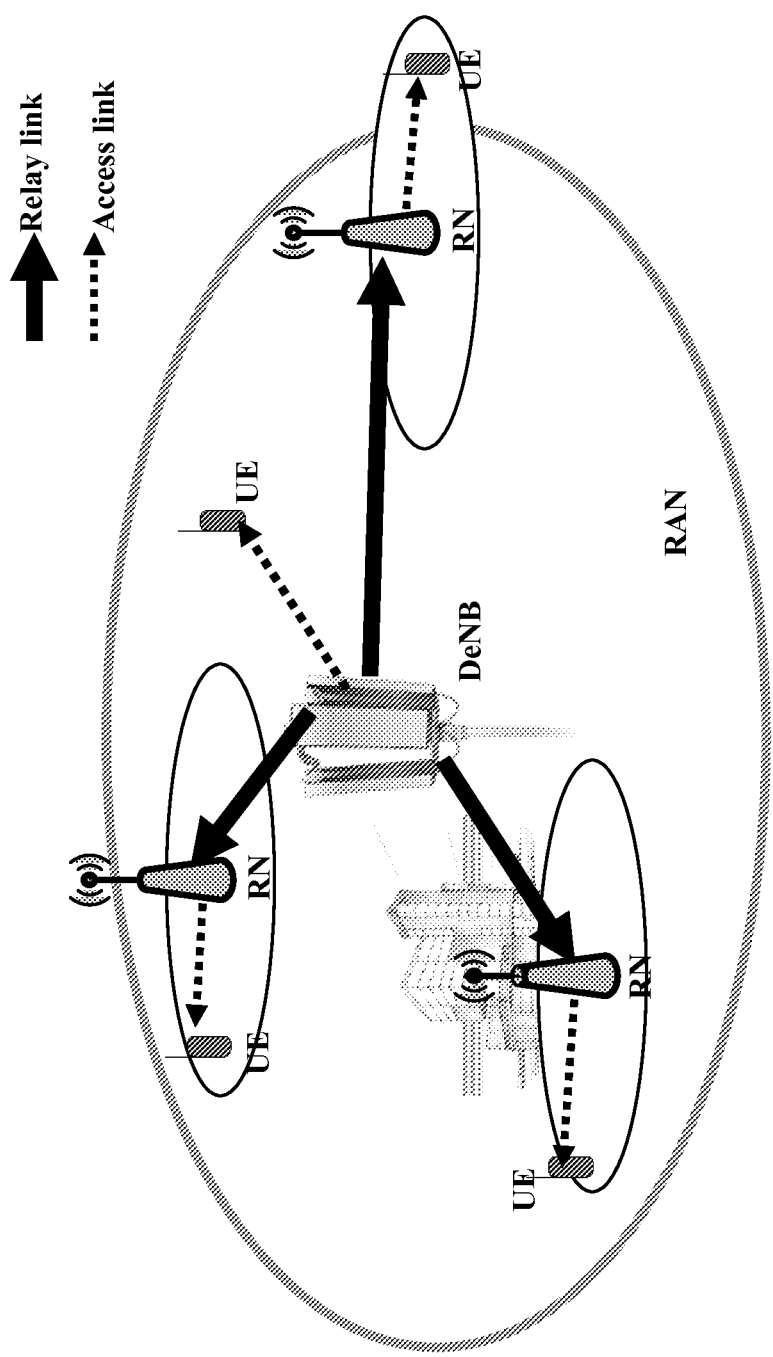
FIG. 1 shows a schematic diagram of a typical deployment scenario of a relay-enhanced access network.

The present invention is described herein with reference to particular non-limiting examples and to what are presently considered to be conceivable embodiments of the present invention. A person skilled in the art will appreciate that the invention is by no means limited to these examples, and may be more broadly applied.

In particular, the present invention and its embodiments are mainly described in relation to 3GPP specifications being used as non-limiting examples for certain exemplary network configurations and deployments. In particular, an LTE (E-UTRAN) radio access network and corresponding standards (Release-8, Release-9, and LTE-Advanced) are used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, embodiments of the present invention may be applicable in any relay-enhanced (cellular) system with a need for signaling optimization. Embodiments of the present invention may be applicable for/in any kind of modern and future communication network including any conceivable mobile/wireless communication networks according to 3GPP (Third Generation Partnership Project) or IETF (Internet Engineering Task Force) specifications.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

In the following, exemplary embodiments of the present invention are described with reference to methods, procedures and functions.

According to exemplary embodiments of the present invention, signaling concentration functionality is provided by means of a concentrator unit. Such concentrator unit, hereinafter exemplarily denoted as X2 concentrator, is configured to act on behalf of subordinate relay node or relay nodes in an underlying relay-enhanced access network. For example, the X2 concentrator may be provided at a base station acting as a donor base station, such as DeNB1 for RNa according to FIGS. 2 and 3, and/or at a relay node gateway, such as a signaling gateway function (SGW) or a packet gateway function (PGW) serving for the respective relay node or relay nodes.

Referring to the above described categorization of conceivable relay architectures, the incorporation of the X2 concentrator according to exemplary embodiments of the present invention may be as follows.

For a relay architecture of the second category, signaling optimization according to the present invention may be realized by implementation of the X2 concentrator at the donor base station (DeNB), since the DeNB is aware of the X2 messaging between any one of its subordinate and its peers (i.e. X2 interface endpoints). For a relay architecture of the first category, signaling optimization according to the present invention may be realized by implementation of the X2 concentrator at the donor base station (DeNB) being upgraded to be able to "sniff" X2 messages of its relay node or nodes, or by implementation of the X2 concentrator at the a relay node gateway serving the respective relay node or nodes. The relay node gateway may be implemented at a donor base station of the respective relay node or nodes or apart therefrom. That is, the X2 concentrator functionality may be performed by a node other than the DeNB, which may be realized by including the relevant X2 protocol layer functions on top of the RN gateway protocol stack.

Figure 2:
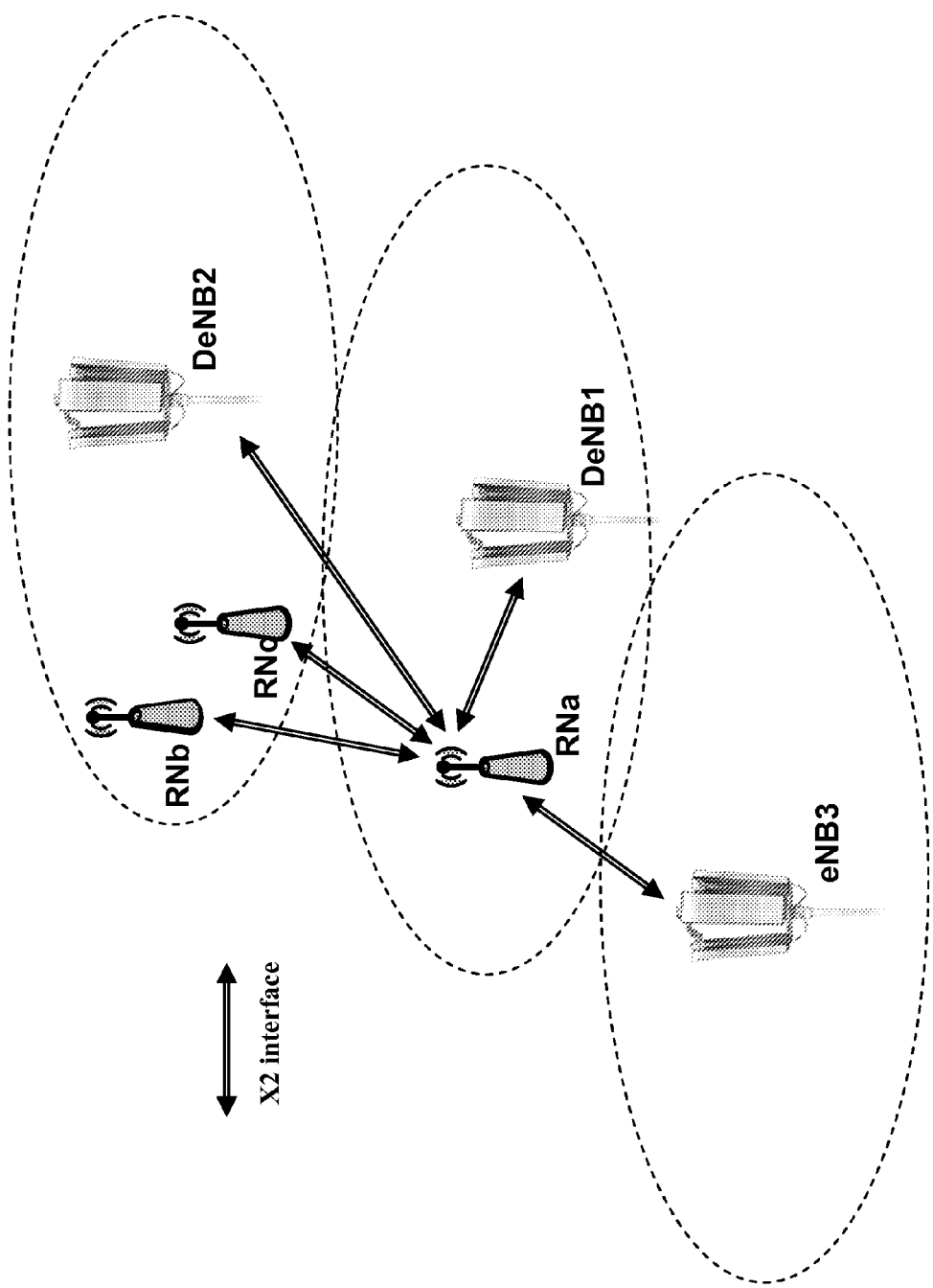
FIG. 2 shows a schematic diagram of a deployment scenario of a relay-enhanced access network with radio-relayed extensions supporting X2 interfaces.
Figure 3:
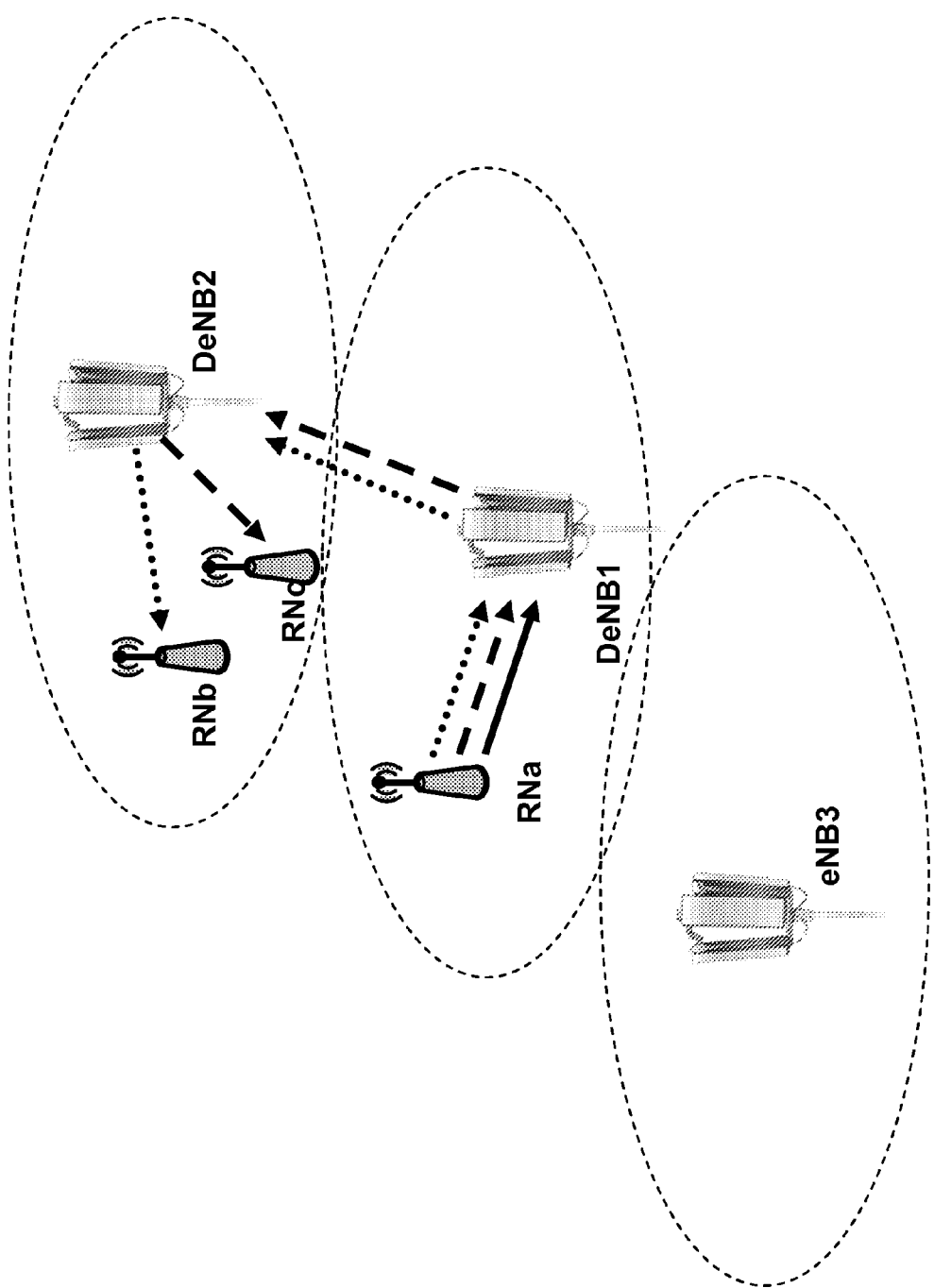
FIG. 3 shows a schematic diagram of a deployment scenario of a relay-enhanced access network illustrating X2 signaling messaging.
Figure 4:
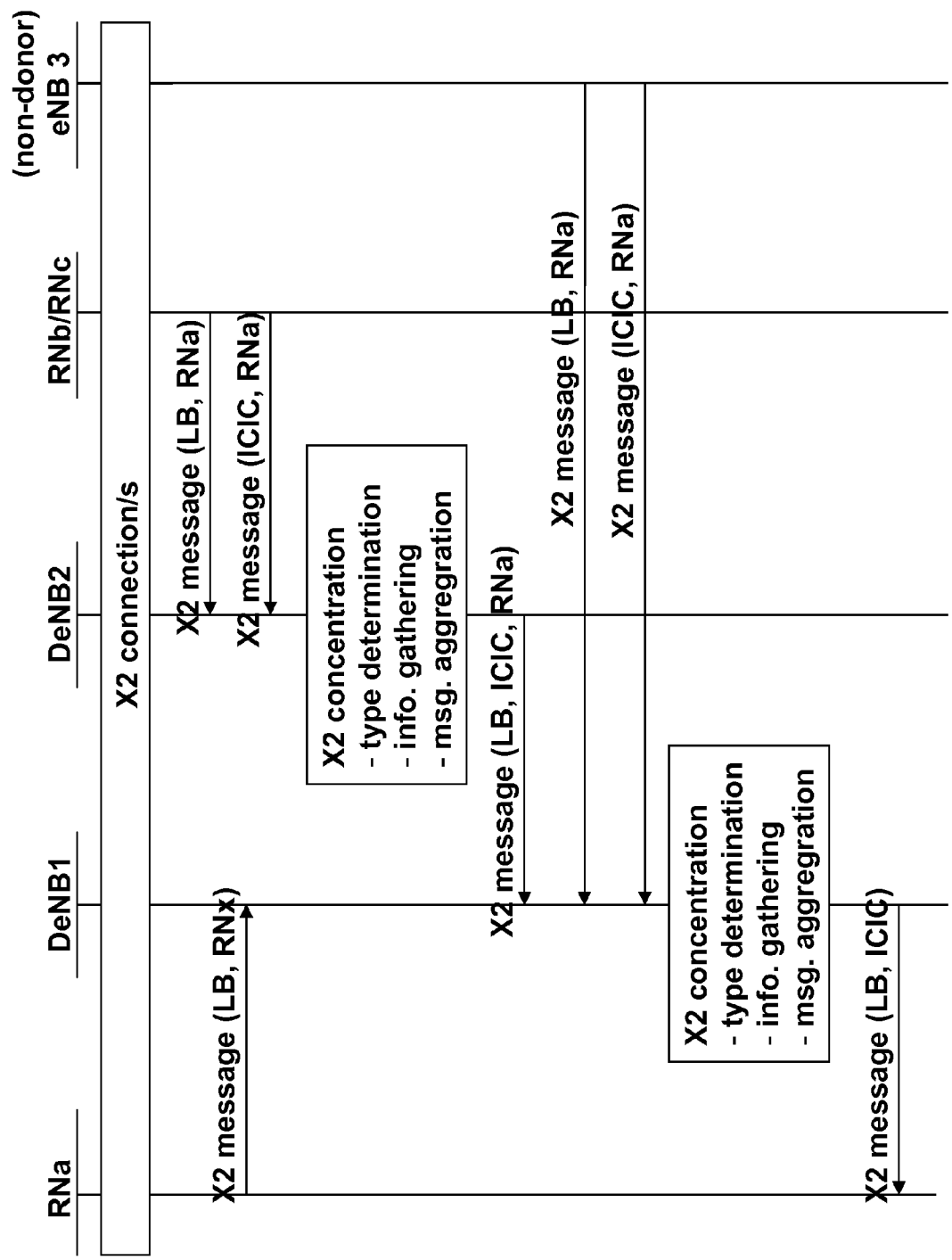
FIG. 4 shows a signaling diagram of a procedure according to exemplary embodiments of the present invention, which is based on the deployment scenario depicted in FIG. 2.

FIG. 4 shows a signaling diagram of a procedure according to exemplary embodiments of the present invention, which is based on the deployment scenario depicted in FIG. 2. In FIG. 4, it is exemplarily assumed that the X2 concentrator functionality is located at DeNB1 which is the DeNB of, thus controlling, relay node RNa. That is, it is directly applicable to above-mentioned relay architecture of the second category or to the above-mentioned relay architecture the first category with an upgraded DeNB being able to intercept and modify the X2 messages.

It is noted that, in the example according to FIG. 4, the X2 concentrator functionality is also located at DeNB2 which is the DeNB of, thus controlling, relay nodes RNb and RNc. While this is particularly useful in terms of a concentration of messages from RNb and RNc towards RNa, it is not necessary that DeNB2 contains the X2 concentrator functionality in addition to DeNB1. According to exemplary embodiments of the present invention, the thus depicted signaling is exemplarily applicable to a LTE E-UTRAN access network with relay extensions, as described above. For example, exemplary embodiments of the present invention may be used for release 10 and beyond of LTE/LTE-Advanced specifications.

As a basis for embodiments of the present invention, it is assumed that X2 connectivity, i.e. connectivity according to X2 interface specifications, is established between the network elements of the underlying relay-enhanced access network, in this case between relay node RNa, its donor base station DeNB1, relay node/s RNb/Rnc, their donor base station DeNB2, and non-donor eNB3. To achieve such X2 connectivity, two approaches are equally conceivable from the perspective of RNa. Firstly, the relay node in question, e.g. RNa, may form a X2 connection with its DeNB and all the neighboring cells that it discovers (i.e. cells belonging to non-donor eNBs or other RNs), and the DeNB may intercept the X2 messages and act upon them. Secondly, relay node in question, e.g. RNa, may form an X2 connection only with its DeNB and, when it discovers any neighbors, it may communicates these discovered neighbors to the DeNB, and the DeNB may form an X2 connection with the neighbor on behalf of RNa.

As shown in FIG. 4, the X2 concentrator at DeNB1 (e.g. a receiver thereof) receives one or more X2 signaling messages from its X2 peers (e.g. DeNB2 and RNa) and/or its subordinate RNs' X2 peers (e.g. RNb/RNc/non-donor eNB3) over the respective X2 interfaces or connections, as indicated in FIG. 2. These X2 signaling messages being received are deemed to concern the same relay node RNa being controlled by DeNB1. As mentioned above, in the present example, an X2 concentrator also exists at DeNB2 that concentrates the X2 messages that are targeted towards RNa (i.e. the concentrated X2 message sent from DeNB2 to DeNB1 contains the relevant and summarized ICIC and LB information that is comprised of the separate X2 messages that would have been sent from DeNB2, RNb and RNc in the case of no concentrator at DeNB2). Then, the X2 concentrator at DeNB1 (e.g. a processor thereof) concentrates the signaling concerning relay node RNa in terms of irrelevancy and/or redundancy from the received X2 signaling messages. Thereafter, the X2 concentrator at DeNB1 (e.g. a transmitter thereof) forwards the concentrated signaling in an X2 signaling message over the respective X2 interface or connection towards the concerned relay node RNa. The X2 message to be sent to a certain RN is a concentrated/summarized version of the X2 messages (and their contents) received from all its peers.

The thus depicted procedure may be performed for each one of the relay nodes being controlled by the respective donor base stations which may be accomplished virtually simultaneously and/or successively.

Thereby, namely by refraining from forwarding any one of the individual X2 signaling messages and by summarizing the thus received signaling information in terms of redundancy and/or irrelevancy with respect to the concerned relay node, the number of signaling messages transferred may be reduced and resources both on the Un and the Uu links may be saved in an efficient manner.

It is to be noted that the sequence of operations, as depicted in FIG. 4, is intended to be exemplarily, and may be different. For example, receipt of a first X2 signaling message at DeNB1 may initiate the X2 concentration functionality, receipt of further X2 signaling messages may be awaited thereupon, and the actual X2 concentration functionality may be performed thereafter (i.e. when enough signaling information has been gathered).

According to exemplary embodiments of the present invention, the signaling concentration may be preformed on the basis of the type of signaling concerned. If so, as indicated in FIG. 4, signaling concentrating comprises a determination of a type of signaling of the received X2 signaling message or messages, a gathering of relevant and/or non-redundant signaling information for the determined type of signaling, and an aggregation of the gathered relevant and/or non-redundant signaling information into the concentrated X2 signaling message to be forwarded to the relay node concerned.

In the example of FIG. 4, it is assumed that the X2 signaling messages received at DeNB1 are of the type relating to load balancing (LB) and/or (inter-cell) interference coordination (ICIC). In this case, all X2 messages (that are not dealing with handover) are intercepted and not forwarded immediately, but rather later on (if not being redundant) after other relevant information has been gathered and summarized. Relevant signaling information include load information and/or resource partitioning between relay nodes of the relay-enhanced access network and/or interference levels at relay nodes of the relay-enhanced access network.

Although not shown in FIG. 4, the X2 signaling messages received at DeNB1 may be of the type relating to mobility of a user equipment in the relay-enhanced access network, i.e. handover. In this case, X2 messages that are dealing with handover, which are received from a subordinate relay node, are intercepted and forwarded immediately towards the intended X2 peer, i.e. the relay node towards which the mobility of the user equipment is directed. In case of X2 connection establishment according to the second approach mentioned above, i.e. the RN forms an X2 connection only with its DeNB, some addressing information may be changed, if required, as there is no direct X2 connection in this case. In a similar fashion, when an X2 message dealing with handover is received at the DeNB and is intended for a subordinate RN, the DeNB also forwards it to the RN in a straightforward manner. Relevant signaling information include address information of a relay node towards which the mobility of the user equipment is directed.

In this regard, it is noted that, though the RNs might have X2 connections towards all their neighbors, they send and/or receive ICIC and LB messages (preferably, each message only once) only to/from their respective DeNB, thereby eliminating the redundancy problem over the Un interface.

Stated in other terms, the X2 concentrator, e.g. at DeNB1, may assemble relevant information from the X2 messages that it is receiving, and may forward the concentrated/summarized version of them (with aggregated signaling content) towards its peers and the peers of its subordinate RNs, i.e. neighbors of a relay node or relay nodes in question.

According to exemplary embodiments of the present invention, the X2 concentrator (e.g. a processor thereof) may synchronize receiving and/or forwarding signaling messages. On the one hand, the X2 concentrator may optionally set the timing of X2 messaging of all its subordinate RNs so that X2 messages will be received from all of them more or less simultaneously. This ensures that the most up-to-date information may be included in the summarized X2 messages. On the other hand, alternatively or additionally, the X2 concentrator may optionally set the timing of sending out X2 messaging to all of its subordinate RNs in a synchronized fashion. This ensures that the concentrated signaling information may be provided to its RNs in a manner with time alignment and with the same periodicity.

According to exemplary embodiments of the present invention, the X2 concentrator may deal with relevancy issues in that the composite message to be sent to a certain (subordinate) RN may be created by considering factors such as the following.

A conceivable factor regarding relevancy of signaling information relates to resource partitioning between neighboring relay nodes. Namely, only those resource blocks (RBs) that are relevant to the concerned RN are to be considered. For example, if the current resource partitioning is in such a way that two neighboring RNs are set to use orthogonal sets of resource blocks, there is no need to communicate the X2 messaging between the two RNs. This is because, due to the orthogonality of resources, no interference is possible between these RNs.

A conceivable factor regarding relevancy of signaling information relates to an interference level. The interference that is received from different neighbors is of different level, and as such, when combining the X2 messages, this should be considered appropriately. For example, if there is no interference between two neighboring RNs, there is no need for exchanging interference information between them.

The consideration of interference levels may, according to exemplary embodiments of the present invention, be realized by applying weighting factors in accordance with the effect of the signaling information from respective relay nodes on the load balancing and/or interference coordination. That is, the larger the effect of certain signaling information is, the higher is a weighting factor for weighting the corresponding gathered signaling information from respective relay nodes. For example, more weighting is to be put to the values that belong to highly interfering peers, e.g. relay nodes of other cells in close proximity.

On the one hand, the base stations may exchange the weighting factors that they are using for their RNs among each other. Accordingly, the weighting of the X2 messages that are destined for a certain RN can be done not only at the DeNB but also at non-donor eNBs where other neighboring RNs might reside. On the other hand, alternatively or additionally, the base stations may assign appropriate weighting factors on the basis of load information and/or resource partitioning and/or interference levels. Accordingly, the weighting of the X2 messages may be adjusted in a dynamic manner.

For example, an appropriate assignment of weighting factors may be effected (e.g. by a processor of the X2 concentrator) in accordance with an automated neighbor relation.

According to proposals for self-organizing networks (SON), an automated neighbor relation (ANR) can be maintained at a base station such as an eNB based on UE measurements. In this regard, UEs may send a strength of a reference signal received power (RSRP) of the cells they detect, and based on the level of reported RSRPs, the eNB (e.g. the DeNB of a concerned RN) may decide to add the reported cell into its neighbor list and also to establish an X2 connection with the neighboring base station or cell to facilitate future handover, LB and ICIC communications.

According to exemplary embodiments of the present invention, this concept may be utilized (and extended) for identifying weighting factors to be used for concentrating/summarizing X2 messages as outlined above. By averaging the reported RSRP strength values from a particular cell over a long duration of time and comparing it with that of other cells, a relay node is capable of detecting the relative interference level of all of its neighbors. This information may be sent from the relay node to its DeNB, once enough statistics are gathered for a given relay node, so that the DeNB is capable of applying the appropriate weighting factors when summarizing the X2 messages. As the X2 application protocol of release 8 supports only the communication of neighbor lists (by including the cell identifiers of the neighbors either during X2 setup request or X2 neighbor list update messages), exemplary embodiments of the present invention provide for an extension for supporting the communication of interference levels. Thus, in order to communicate the proper weighting factors, exemplary embodiments of the present invention provide a new X2 information element (IE), which may be embedded to include also the interference level in X2 signaling messages, and/or a new X2 message, which may communicate only the interference level of a given (set of) cell(s).

Figure 5:
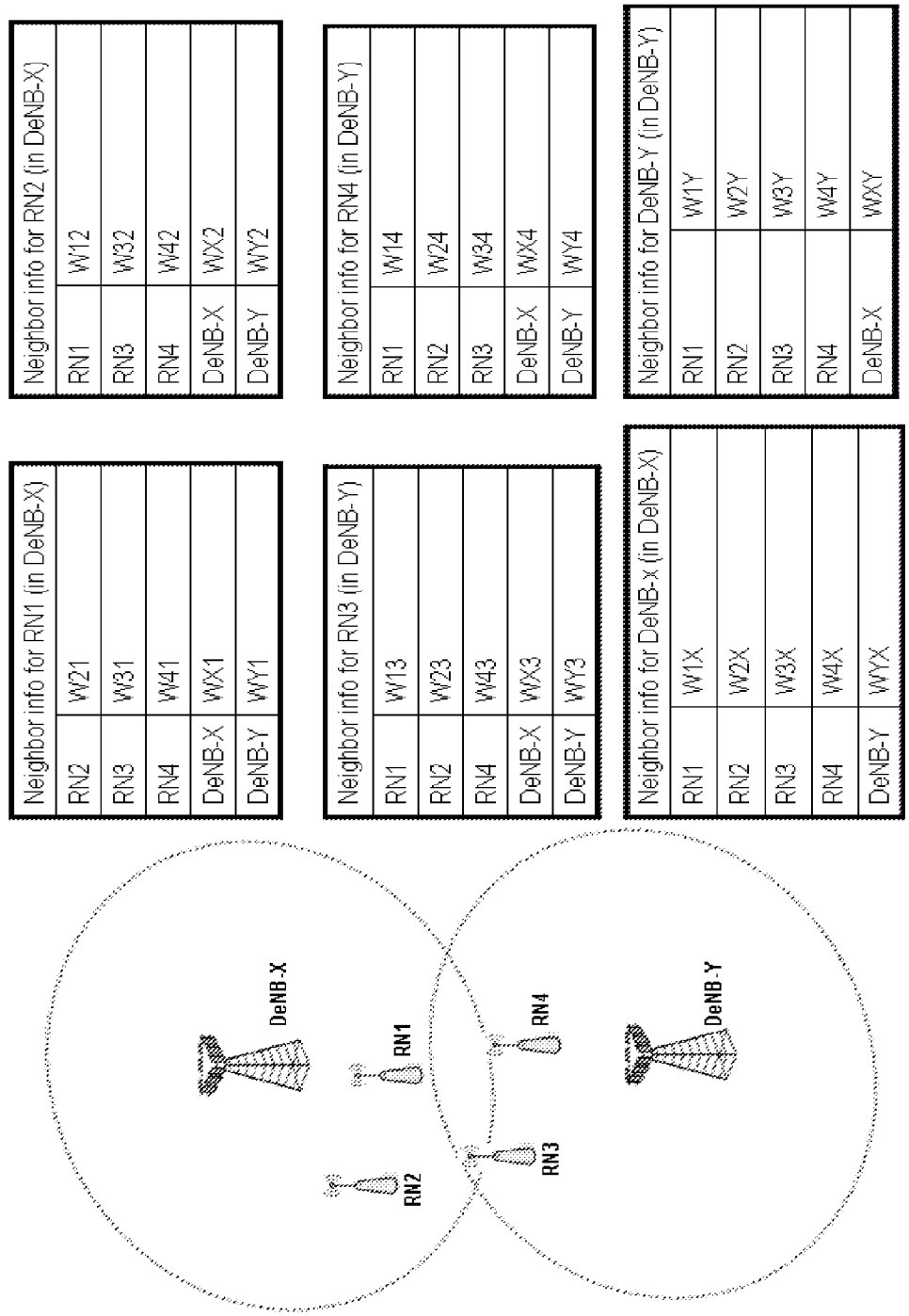
FIG. 5 shows an explanatory illustration of weighting tables according to exemplary embodiments of the present invention.

The concept of X2 concentration based on weighting factors is illustrated in FIG. 5.

FIG. 5 shows an explanatory illustration of weighting tables according to exemplary embodiments of the present invention. In FIG. 5, there is exemplarily assumed a case with two neighboring (macro) cells, wherein two relay nodes RN1 and RN2 together with their donor base station DeNB-X reside in a first cell, and two relay nodes RN3 and RN4 together with their donor base station DeNB-Y reside in a second cell.

As shown in FIG. 5, the weighting factor of each neighbor of the RN concerned is kept at its DeNB, and the DeNB may be configured to sum the X2 messages that come from each neighbor using these weights and to forward them to the RN. As mentioned above, the DeNBs may also exchange the weighting tables, so that the summary could be performed at the source DeNB instead of at the destination DeNB. For example, if the weighting tables for RN1 and RN2 are similar with regard to RN3, RN4 and DeNB-Y, and the weighting tables are also available in DeNB-Y, then instead of sending the un-summarized X2 messages of RN3 and RN4 from DeNB-Y to DeNB-X, the summary could already be performed at DeNB-Y and sent to the DeNB-X in a concentrated manner, and then be forwarded to RN1 and RN2 after the inputs of RN2 and RN1, respectively, are also added upon.

Enabling the exchange of weighting information tables between DeNBs and the communication of weight values (gathered through, for example, UE measurements) by the RNs towards their DeNBs can be realized on the basis of the X2 application protocol of release 8.

According to exemplary embodiments of the present invention, the original usage of HII messages may be combined and, thus, still be employed in connection with the present signaling concentration. That is, the present signaling concentration may be used along with an enablement of resource partitioning in relay-enhanced networks, where HII messages are also used for requesting and granting of resource partitioning, by differentiating the two purposes using a one bit identifier in the HII messages.

According to exemplary embodiments of the present invention, if there is a dense deployment of relay nodes, and there are several relay nodes that are destined to receive similar X2 messages, a special physical channel can be used to broadcast the X2 messages to all of them at once instead of sending individual messages. That is, the present signaling concentration may be used along with an enablement of resource partitioning in relay-enhanced networks, where resource partitioning messages are compressed.

According to exemplary embodiments of the present invention, even in the case of synchronized X2 messaging of the RNs towards their DeNBs, there will always be a time lag between the messages from interferers in a neighboring cell as compared with those within the same cell, which is due the need to forward the X2 messages between the DeNBs. The DeNBs may consider this e.g. by considering the X2 messages from the previous reporting period when adding them to the X2 messages coming from interferers in neighbor cells.

According to exemplary embodiments of the present invention, alternatively or additionally, not only load on access links but also load on backhaul links may be considered and, thus, exchanged between neighboring RNs. Assuming that, referring to the example of FIG. 5, RN1 and RN2 send load information to RN3 and RN4, the quality and capacity information on the RN1 and RN2 access links are sent from DeNB-X to DeNB-Y while the capacity and quality information on the backhaul link (in case RN1 and RN2 share the same radio resources for backhauling) can be sent only one time between DeNB-X and DeNB-Y. Such approach complies with a recent approach for setting handover thresholds also taking into account the load experienced by the backhaul link in the donor cell.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 6, while for the sake of brevity reference is made to the detailed description of respective corresponding methods and operations according to FIGS. 4 and 5 on the basis of FIG. 2, respectively.

Figure 6:
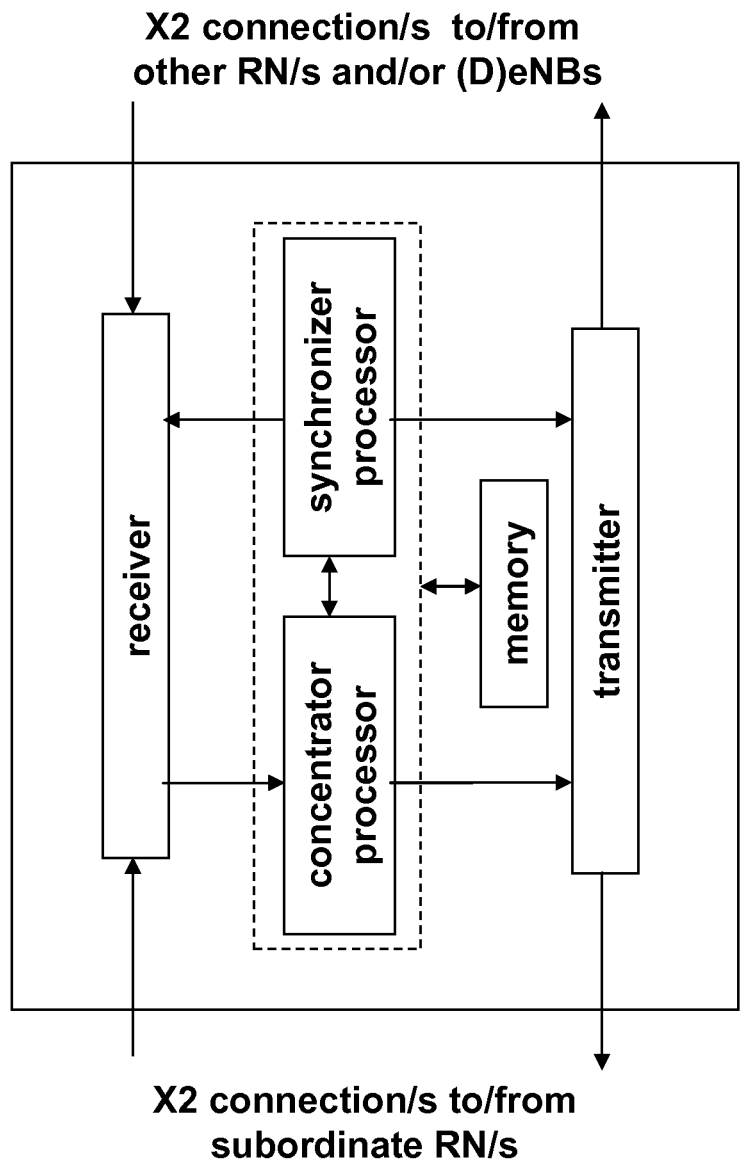
FIG. 6 shows a block diagram of an apparatus according to exemplary embodiments of the present invention.

In FIG. 6 below, the solid line blocks are basically configured to perform respective operations as described above. The entirety of solid line blocks are basically configured to perform the methods and operations as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows interconnecting individual blocks are meant to illustrate an operational coupling there-between, which may be a physical and/ or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 6, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 6 shows a block diagram of an apparatus according to exemplary embodiments of the present invention. In view of the above, the thus described apparatus represents a X2/signaling concentrator and may be implemented by or at a donor base station, a non-donor base station, and/or a relay node gateway, as described above.

According to FIG. 6, the apparatus according to exemplary embodiments of the present invention is configured to perform a procedure as described in conjunction with FIGS. 4 and 5. Therefore, while basic operations are described hereinafter, reference is made to the above description for details.

According to an exemplary embodiment depicted in FIG. 6, the thus depicted X2 concentrator comprises a receiver, a concentrator processor, and a transmitter. The receiver is preferably configured to receive at least one X2/signaling message concerning at least one relay node, e.g. RNa in FIG. 2, over at least one predetermined X2/signaling interface, thus representing means for receiving corresponding signaling messages. The concentrafor processor is preferably configured to concentrate signaling concerning a respective relay node, e.g. RNa, in terms of irrelevancy and/or redundancy from the at least one signaling message, thus representing means for concentrating corresponding signaling. Stated in other word, the concentrator processor may be configured to filter out unnecessary messages. The transmitter is preferably configured to forward the concentrated signaling in a signaling message over the at least one predetermined X2/signaling interface towards the respective relay node, e.g. RNa, thus representing means for forwarding (i.e. transmitting) corresponding concentrated signaling messages.

The concentrator processor may be specifically configured to process address information of a relay node towards which the mobility of the user equipment is directed, if the type of signaling relates to mobility of a user equipment in the relay-enhanced access network. Alternatively or additionally, the concentrator processor may be specifically configured to process load information and/or resource partitioning between relay nodes of the relay-enhanced access network and/or interference levels at relay nodes of the relay-enhanced access network, if the type of signaling relates to load balancing and/or interference coordination.

According to an exemplary embodiment, the concentrator processor is preferably configured to determine a type of signaling of the at least one received signaling message, thus representing means for determining a type of signaling, to gather (relevant and/or non-redundant) signaling information for the determined type of signaling, thus representing means for gathering information to be concentrated, and to aggregate the gathered signaling information into the signaling message to be forwarded, thus representing means for aggregating signaling information for concentration purposes.

The concentrator processor may be specifically configured to, for aggregation purposes, apply weighting of gathered relevant and/or non-redundant signaling information from different relay nodes by weighting factors, as described above. Stated in other word, the concentrator processor may be configured put appropriate weight on the signaling contents to be forwarded, i.e. not to be filtered out.

Such weighting may be effected in accordance with the effect of the signaling information from respective relay nodes on the load balancing and/or interference coordination, as described above.

The concentrator processor may be specifically configured to control exchanging of weighting factors between base stations of the relay-enhanced access network, and/or to assign appropriate weighting factors on the basis of load information and/or resource partitioning and/or interference levels in accordance with an automated neighbor relation, as described above.

According to an exemplary embodiment, the thus depicted apparatus may additionally comprise a synchronizer processor. The synchronizer processor is preferably configured to synchronize receiving signaling messages from and/or forwarding signaling messages to relay nodes (in particular, those being controlled by a common donor base station), thus representing means for synchronizing message receipt and/or transmission.

The concentrator processor and the synchronizer processor may be implemented by distinct processor units or by a single common processor unit (as indicated by the dashed block around them in FIG. 6).

According to an exemplary embodiment, the thus depicted apparatus may additionally comprise a memory being connected to the one or more processors. The memory is preferably configured to store any permanent and/or temporary data for use in the signaling concentration according embodiments of the present invention. For example, data regarding redundancy and/or (ir-)relevancy of certain signaling information and/or data regarding weighting factors/tables, neighbor relations, or the like may be stored in the memory for use by the one or more processors.

According to exemplarily embodiments of the present invention, although not illustrated in detail, there is provided an apparatus representing a functional complement to the X2/signaling concentrator described above. Such apparatus may be implemented by or at a relay node of a cell containing the apparatus implementing the X2/signaling concentrator, e.g. a donor base station and/or relay node gateway. For example, such apparatus may be implemented by or at relay node RNa being controlled by and subordinated to donor base station DeNB1 according to FIGS. 2 and 4 above.

Such apparatus according to exemplary embodiments of the present invention is configured to perform a procedure as described in conjunction with FIGS. 4 and 5, as regards the perspective of the relay node in question. Therefore, reference is made to the above description for details.

For example, such apparatus comprises at least a processor and/or memory as well as respective transmitter and/or receiver units. The thus structured apparatus may be configured to form a X2 connection or interface with the donor base station or the donor base station and neighboring cells. It may also be configured to send and/or receive all its signaling messages such as e.g. X2 messages, including at least messages relating to UE mobility (handover), LB, and ICIC, to and/or from its donor base station. Hence, as the thus structured apparatus is configured to send such signaling messages (preferably, each message only once) only to its donor base station, the previous redundancy problem over the Un interface may be eliminated. Further, the thus structured apparatus may be configured to cooperate with the rest of the relay-enhanced access network (including donor and non-donor base stations, and other relay nodes) as described above, for example as regards automated neighbor relation (ANR) procedures, provision of UE measurements for weighting factor calculation, and the like. The transmitter and/or receiver units thereof may for example be configured to operate on a special physical channel.

According to exemplarily embodiments of the present invention, a system may comprise any conceivable combination of the thus depicted apparatus (such as a donor base station) and other network elements (such as subordinate and/or other relay nodes, other base stations, or the like), which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Generally, for the purpose of the present invention as described herein above, it should be noted that method steps and functions likely to be implemented as software code portions and being run using a processor at one of the entities, a network element, or a terminal (as examples of devices, apparatuses and/or modules thereof, or as examples of entities including apparatuses and/or modules therefor), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There are provided measures for optimized signaling in relay-enhanced access networks, said measures exemplarily comprising receipt of at least one signaling message concerning at least one relay node of a relay-enhanced access network over at least one predetermined signaling interface, concentration of signaling concerning a respective relay node in terms of irrelevancy and/or redundancy from the at least one signaling message, and forwarding of the concentrated signaling in a signaling message over the at least one predetermined signaling interface towards the respective relay node. Said measures may exemplarily be applied for optimizing X2 messaging in relay-enhanced LTE access networks.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method comprising receiving at least one signaling message concerning at least one relay node of a relay-enhanced access network over at least one predetermined signaling interface, concentrating signaling at least by gathering relevant and/or non-redundant signaling information from the at least one signaling message and filtering out irrelevant or redundant signaling information from the at least one signaling message, wherein the concentrated signaling concerns a respective relay node, and sending the concentrated signaling in a signaling message over the at least one predetermined signaling interface towards the respective relay node.

2. The method according to according to claim 1, said concentrating comprising
determining a type of signaling of the at least one received signaling message,
gathering relevant and/or non-redundant signaling information for the determined type of signaling from relay nodes of the relay-enhanced access network, and
aggregating the gathered signaling information into the signaling message to be sent.

3. The method according to claim 2, wherein, if the type of signaling is determined to relate to mobility of a user equipment in the relay-enhanced access network, the signaling information to be gathered and aggregated may include relevant and/or non-redundant address information of a relay node towards which the mobility of the user equipment is directed.

4. The method according to claim 2, wherein, if the type of signaling is determined to relate to load balancing and/or interference coordination, the signaling information to be gathered and aggregated may include relevant and/or non-redundant load information and/or relevant and/or non-redundant information on resource partitioning between relay nodes of the relay-enhanced access network and/or relevant and/or non-redundant information on interference levels at relay nodes of the relay-enhanced access network.

5. The method according to claim 4, said aggregating comprising weighting of gathered relevant and/or non-redundant signaling information from different relay nodes by weighting factors in accordance with the effect of the signaling information from respective relay nodes on the load balancing and/or interference coordination.

6. The method according to claim 5, further comprising exchanging weighting factors between base stations of the relay-enhanced access network, and/or assigning appropriate weighting factors on the basis of load information and/or resource partitioning and/or interference levels in accordance with an automated neighbor relation.

7. The method according to claim 1, further comprising synchronizing receiving signaling messages from and/or sending signaling messages to relay nodes being controlled by a common donor base station.

8. The method according to claim 1, wherein
the method is operable at or by a donor base station controlling said at least respective relay node, a non-donor base station not controlling said respective relay node, and/or a relay node gateway of said respective relay node, and said donor base station, non-donor base station and/or relay node gateway are part of an evolved radio access network in accordance with LTE and/or LTE-Advanced specifications, and/or
the at least one predetermined signaling interface is a X2 interface in accordance with LTE and/or LTE-Advanced specifications, and peers of the X2 interface may include said donor base station, said non-donor base station, said relay node gateway, said respective relay node, and/or one or more neighboring relay nodes of said respective relay node.

9. A computer program product including a non-transitory computer-readable medium comprising software code portions being arranged, when run on a processor of an apparatus, to perform the method according to claim 1.

10. The method of claim 1, wherein concentrating signaling further comprises gathering relevant and/or non-redundant signaling information from the at least one signaling message and filtering out irrelevant or redundant signaling information from the at least one signaling message, wherein the at least one signaling message comprises messages from multiple relay-nodes in the relay-enhanced access network.

11. The method of claim 1, wherein concentrating signaling further comprises gathering relevant and/or non-redundant signaling information from the at least one signaling message and filtering out irrelevant or redundant signaling information from the at least one signaling message, wherein the at least one signaling message comprises messages from one or more relay-nodes and one or more base stations in the relay-enhanced access network.

12. An apparatus comprising
a receiver configured to receive at least one signaling message concerning at least one relay node of a relay-enhanced access network over at least one predetermined signaling interface,
a processor configured to concentrate signaling at least by gathering relevant and/or non-redundant signaling information from the at least one signaling message and filtering out irrelevant or redundant signaling information from the at least one signaling message, wherein the concentrated signaling concerns a respective relay node, and
a transmitter configured to send the concentrated signaling in a signaling message over the at least one predetermined signaling interface towards the respective relay node.

13. The apparatus according to according to claim 12, said processor being configured to
determine a type of signaling of the at least one received signaling message,
gather relevant and/or non-redundant signaling information for the determined type of signaling from relay nodes of the relay-enhanced access network, and
aggregate the gathered signaling information into the signaling message to be sent.

14. The apparatus according to claim 13, wherein, if the type of signaling is determined to relate to mobility of a user equipment in the relay-enhanced access network, the signaling information to be gathered and aggregated may include relevant and/or non-redundant address information of a relay node towards which the mobility of the user equipment is directed.

15. The apparatus according to claim 13, wherein, if the type of signaling is determined to relate to load balancing and/or interference coordination, the signaling information to be gathered and aggregated may include relevant and/or non-redundant load information and/or relevant and/or non-redundant information on resource partitioning between relay nodes of the relay-enhanced access network and/or relevant and/or non-redundant information on interference levels at relay nodes of the relay-enhanced access network.

16. The apparatus according to claim 15, said aggregating comprising weighting of gathered relevant and/or non-redundant signaling information from different relay nodes by weighting factors in accordance with the effect of the signaling information from respective relay nodes on the load balancing and/or interference coordination.

17. The apparatus according to claim 16, said processor being further configured to control exchanging weighting factors between base stations of the relay-enhanced access network, and/or to assign appropriate weighting factors on the basis of load information and/or resource partitioning and/or interference levels in accordance with an automated neighbor relation.

18. The apparatus according to claim 12, wherein the processor is further configured to synchronize receiving signaling messages from and/or sending signaling messages to relay nodes being controlled by a common donor base station.

19. The apparatus according to claim 12, wherein
  the apparatus is operable as or at a donor base station controlling said respective relay node, a non-donor base station not controlling said respective relay node, and/or a relay node gateway of said respective relay node, and said donor base station, non-donor base station and/or relay node gateway are part of an evolved radio access network in accordance with LTE and/or LTE-Advanced specifications, and/or
  the at least one predetermined signaling interface is a X2 interface in accordance with LTE and/or LTE-Advanced specifications, and peers of the X2 interface may include said donor base station, said non-donor base station, said relay node gateway, said respective relay node, and/or one or more neighboring relay nodes of said respective relay node.

20. An apparatus, comprising:
  at least one processor; and
  at least one memory including computer program code,
  the at least one memory and the computer program code configured, with the at least one processor, to cause the apparatus to perform at least the following:
  receiving at least one signaling message concerning at least one relay node of a relay-enhanced access network over at least one predetermined signaling interface,
  concentrating signaling at least by gathering relevant and/or non-redundant signaling information from the at least one signaling message and filtering out irrelevant or redundant signaling information from the at least one signaling message, wherein the concentrated signaling concerns a respective relay node, and
  sending the concentrated signaling in a signaling message over the at least one predetermined signaling interface towards the respective relay node.

* * * * *

UNITED STATES PATENT AND TRADEMARK OFFICE
CERTIFICATE OF CORRECTION

| | | |
|---|---|---|
| PATENT NO. | : 9,065,533 B2 | Page 1 of 1 |
| APPLICATION NO. | : 13/583749 | |
| DATED | : June 23, 2015 | |
| INVENTOR(S) | : Teyeb et al. | |

It is certified that error appears in the above-identified patent and that said Letters Patent is hereby corrected as shown below:

In the claims,
In Claim 8:
Column 19, line 47, "at least" should be deleted.

Signed and Sealed this
Twenty-second Day of December, 2015

Michelle K. Lee
*Director of the United States Patent and Trademark Office*